(12) United States Patent
Harada et al.

(10) Patent No.: US 12,145,450 B2
(45) Date of Patent: Nov. 19, 2024

(54) VEHICLE CONTROL DEVICE

(71) Applicant: DENSO CORPORATION, Kariya (JP)

(72) Inventors: Akihiro Harada, Kariya (JP); Shigeru Kamio, Kariya (JP); Seiji Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/493,405

(22) Filed: Oct. 24, 2023

(65) Prior Publication Data

US 2024/0059155 A1    Feb. 22, 2024

Related U.S. Application Data

(63) Continuation of application No. PCT/JP2022/014048, filed on Mar. 24, 2022.

(30) Foreign Application Priority Data

Apr. 28, 2021 (JP) .................. 2021-076451

(51) Int. Cl.

| | |
|---|---|
| *F16H 63/48* | (2006.01) |
| *B60L 15/20* | (2006.01) |
| *F16H 59/52* | (2006.01) |
| *F16H 59/66* | (2006.01) |
| *F16H 59/70* | (2006.01) |

(Continued)

(52) U.S. Cl.

CPC .............. *B60L 15/20* (2013.01); *F16H 59/52* (2013.01); *F16H 59/66* (2013.01); *F16H 59/70* (2013.01); *F16H 63/3466* (2013.01); *F16H 2059/663* (2013.01); *F16H 63/48* (2013.01); *F16H 63/50* (2013.01)

(58) Field of Classification Search

CPC ................ B60W 10/182; B60W 10/08; B60K 2001/001; F16H 63/48; F16H 63/50; B60L 15/20

See application file for complete search history.

(56) References Cited

U.S. PATENT DOCUMENTS

| | | | |
|---|---|---|---|
| 9,399,454 B2 * | 7/2016 | Somerville | ............. F16H 63/48 |
| 10,571,023 B2 * | 2/2020 | Neelakantan | ........... F16H 63/50 |

(Continued)

FOREIGN PATENT DOCUMENTS

| | | | |
|---|---|---|---|
| JP | 2011051443 A | * | 3/2011 |
| JP | 2019122168 A | | 7/2019 |

(Continued)

*Primary Examiner* — Sherry L Estremsky

(74) *Attorney, Agent, or Firm* — Nixon & Vanderhye P.C.

(57) ABSTRACT

A vehicle control device controls a vehicle drive system including a main motor as a drive source of a vehicle, a parking lock mechanism, and an actuator. The vehicle control device includes an actuator drive control section that controls a drive of the actuator, a main motor drive control section that controls a drive of the main motor, and a range determination unit that determines whether or not a shift range is a parking range. When releasing the parking lock, if the parking range is not released within a parking range release determination time that is variable according to an operating environment, the main motor drive control section performs a meshing surface pressure reduction control for driving the main motor so as to reduce a meshing surface pressure between a parking gear and a parking lever.

6 Claims, 12 Drawing Sheets

(51) Int. Cl.
*F16H 63/34* (2006.01)
*F16H 63/50* (2006.01)

(56) References Cited

U.S. PATENT DOCUMENTS

2008/0071455 A1* 3/2008 Shiraki ............... B60L 15/2018
  188/162
2009/0099748 A1* 4/2009 Watanabe ............. B60T 13/746
  701/70
2024/0067142 A1* 2/2024 Harada .................... B60T 1/06

FOREIGN PATENT DOCUMENTS

| WO | 2022230477 A1 | 11/2022 |
| WO | 2022230478 A1 | 11/2022 |
| WO | 2022230479 A1 | 11/2022 |
| WO | 2023276682 A1 | 1/2023 |
| WO | 2023276683 A1 | 1/2023 |

* cited by examiner

VEHICLE CONTROL DEVICE

CROSS REFERENCE TO RELATED APPLICATIONS

This application is a continuation application of International Patent Application No. PCT/JP2022/014048 filed on Mar. 24, 2022, which designated the U.S. and based on and claims the benefits of priority of Japanese Patent Application No. 2021-076451 filed on Apr. 28, 2021. The entire disclosures of all of the above applications are incorporated herein by reference.

TECHNICAL FIELD

The present disclosure relates to a vehicle control device.

BACKGROUND

Conventionally, an electronic control device is known that controls an operation of a parking lock mechanism via an actuator to switch a shift range of an automatic transmission.

SUMMARY

An object of the present disclosure is to provide a vehicle control device capable of appropriately releasing a parking lock.

A vehicle control device of the present disclosure controls a vehicle drive system. The vehicle drive system includes a main motor, a parking lock mechanism, and an actuator. The main motor is a drive source of a vehicle. The parking lock mechanism has a parking lever that can lock an axle by engaging a parking gear connected to the axle, and locks a rotation of the axle by engaging a parking gear and the parking lever. The actuator drives the parking lever.

The vehicle control device includes an actuator drive control section that controls drive of the actuator, a main motor drive control section that controls a drive of the main motor, and a range determination section that determines whether or not a shift range is a parking range.

When releasing the parking lock, if the parking range is not released within the parking range release determination time that is variable according to an operating environment, the main motor drive control section performs a meshing surface pressure reduction control for driving the main motor so as to reduce a meshing surface pressure between the parking gear and the parking lever.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In an assumable example, an electronic control device is known that controls an operation of a parking lock mechanism via an actuator to switch a shift range of an automatic transmission. For example, when the parking lock mechanism cannot be released by an output torque of the actuator, the motor generator, which is a drive source, outputs drive torque capable of releasing the parking lock mechanism.

In the above example, it is determined whether or not the shift range is released from a P range based on an electrical signal output by a shift range sensor. When the shift range is not released from the P range, a cancel torque is output to a parking lock mechanism by controlling an electric motor MG, which is a drive source. Here, the time to determine whether to release from the P range is relatively long after the start of driving an actuator, a responsiveness deteriorates. On the other hand, if the time to determine whether to release from the P range is relatively short, when the responsiveness of the actuator is poor, it may be erroneously determined that the torque of the actuator is insufficient. An object of the present disclosure is to provide a vehicle control device capable of appropriately releasing a parking lock.

A vehicle control device of the present disclosure controls a vehicle drive system. The vehicle drive system includes a main motor, a parking lock mechanism, and an actuator. The main motor is a drive source of a vehicle. The parking lock mechanism has a parking lever that can lock an axle by engaging a parking gear connected to the axle, and locks a rotation of the axle by engaging a parking gear and the parking lever. The actuator drives the parking lever.

The vehicle control device includes an actuator drive control section that controls drive of the actuator, a main motor drive control section that controls drive of the main motor, and a range determination section that determines whether or not a shift range is a parking range.

When releasing the parking lock, if the parking range is not released within the parking range release determination time that is variable according to an operating environment, the main motor drive control section performs a meshing surface pressure reduction control for driving the main motor so as to reduce a meshing surface pressure between the parking gear and the parking lever. Thereby, the parking lock can be properly released.

Hereinafter, a vehicle control device will be described with reference to the drawings. Hereinafter, in a plurality of embodiments, a substantially equivalent configuration will be denoted by an identical reference, and explanation thereof will be omitted.

One Embodiment

Figure 1:
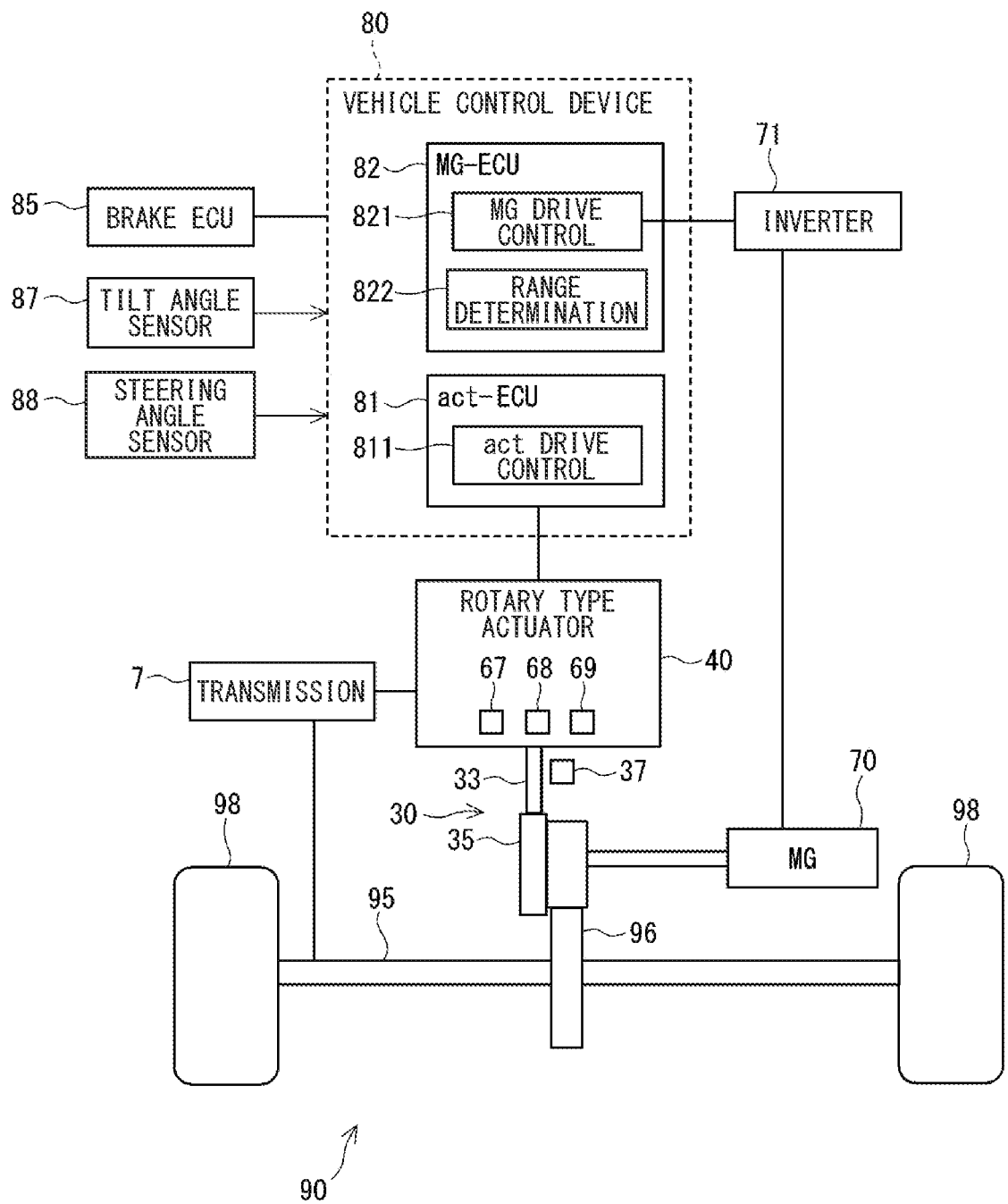
FIG. 1 is a schematic configuration diagram showing a vehicle drive system according to one embodiment.

An embodiment is shown in FIGS. 1 to 9. As shown in FIG. 1, a vehicle drive system 90 includes a main motor 70, an inverter 71, a parking lock mechanism 30, an actuator 40, a vehicle control device 80, and the like, and is mounted on a vehicle 100 (see FIG. 6). Hereinafter, the main motor 70 will be referred to as "MG" as appropriate.

The main motor 70 is a so-called "motor generator." The main motor 70 has a function of an electric motor that generates torque by being driven by electric power from a battery (not shown) via the inverter 71 and a function of a generator that is driven when the vehicle 100 is decelerated to generate electricity. The driving force generated by the main motor 70 rotates the wheels 98 via a reduction gear 72 and an axle 95. FIG. 1 shows an example of an electric vehicle in which the drive source of the vehicle 100 is the main motor 70, but the vehicle 100 may be a hybrid vehicle that also has an engine (not shown) as the drive source. A detent mechanism 20 is omitted in FIG. 1.

Figure 2:
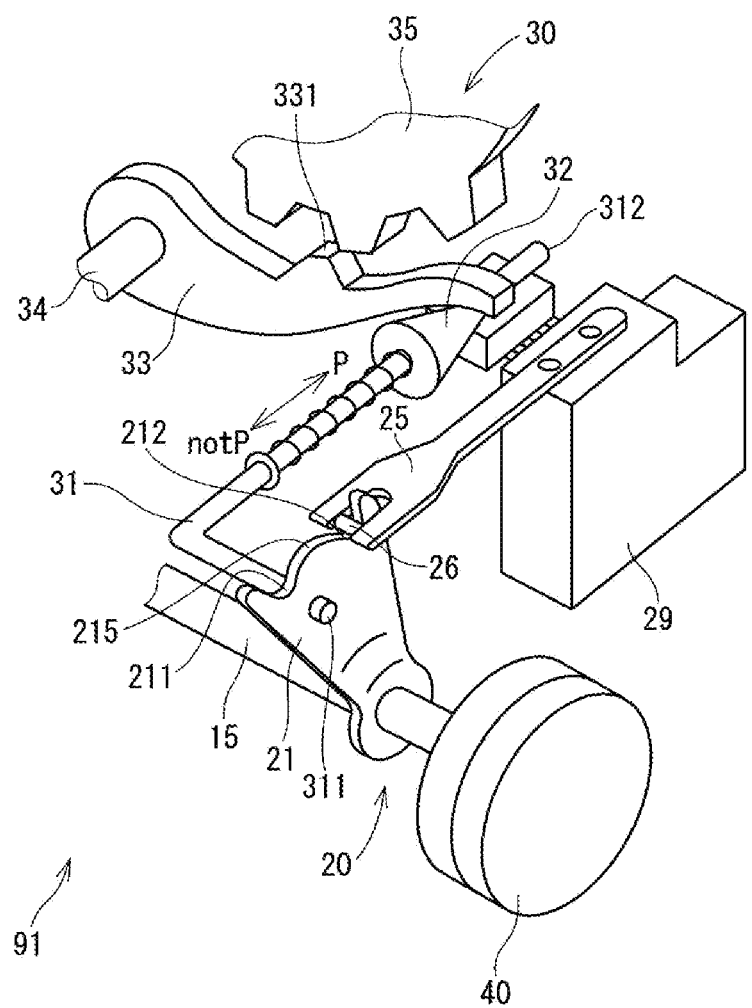
FIG. 2 is a perspective view explaining a detent switching mechanism and a parking lock mechanism according to one embodiment.

As shown in FIG. 2, a shift-by-wire system 91 includes the actuator 40, the detent mechanism 20, the parking lock mechanism 30, and the like. The actuator 40 is of a rotary type and includes a motor 50 and a power transmission section 510 (see FIG. 3, etc.).

The motor 50 is a DC motor with brushes, and rotates when power is supplied from a battery (not shown) through a drive circuit such as an H bridge circuit, and functions as a drive source for the detent mechanism 20. The detent mechanism 20 has a detent plate 21, a detent spring 25 and the like, and transmits rotational driving force output from the motor 50 to the parking lock mechanism 30.

The detent plate 21 is fixed to an output shaft 15 and driven by the motor 50. On the detent spring 25 side of the detent plate 21, two valley portions 211 and 212 and a peak portion 215 separating the two valley portions 211 and 212 are provided.

The detent spring 25 is an elastically deformable plate-like member, and is provided with a detent roller 26 at a tip of the detent spring 25. The detent spring 25 urges the detent roller 26 toward a rotation center of the detent plate 21. In an no-load state, a position where the detent rollers 26 are dropped by the spring force of the detent spring 25 is referred to as a bottommost portion of the valley portions 211 and 212.

When a rotational force equal to or greater than a predetermined force is applied to the detent plate 21, the detent spring 25 is elastically deformed, and the detent roller 26 moves between the valley portions 211 and 212. By fitting the detent roller 26 into one of the two valley portions 211 and 212, the swinging of the detent plate 21 is restricted, and a state of the parking lock mechanism 30 is fixed, and the shift range is fixed.

The parking lock mechanism 30 includes a parking rod 31, a conical member 32, a parking lever 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312. When the detent plate 21 rotates in the direction in which the detent roller 26 fits into the valley portion 211 corresponding to the P range, the conical member 32 moves in the direction of the arrow P.

The parking lever 33 comes into contact with a conical surface of the conical member 32 and is provided so as to be swingable around the shaft part 34. On the parking gear 35 side of the parking lever 33, a protrusion 331 that can mesh with the parking gear 35 is provided. When the conical member 32 moves in the direction of the arrow P due to the rotation of the detent plate 21, the parking lever 33 is pushed up and the protrusion 331 and the parking gear 35 mesh with each other. On the other hand, when the conical member 32 moves in the direction of the arrow notP, the meshing between the protrusion 331 and the parking gear 35 is released.

The parking gear 35 is connected to an axle 95 via a reduction gear set 96 (see FIG. 1), and is provided so as to be able to mesh with the protrusion 331 of the parking lever 33. When the parking gear 35 meshes with the protrusion 331, a rotation of the axle 95 is restricted. When the shift range is one of the ranges (not P range) other than the P range, the parking gear 35 is not locked by the parking lever 33. Therefore, the rotation of the axle 95 is not restricted by the parking lock mechanism 30. When the shift range is the P range, the parking gear 35 is locked by the parking lever 33 and the rotation of the axle 95 is restricted.

Figure 3:
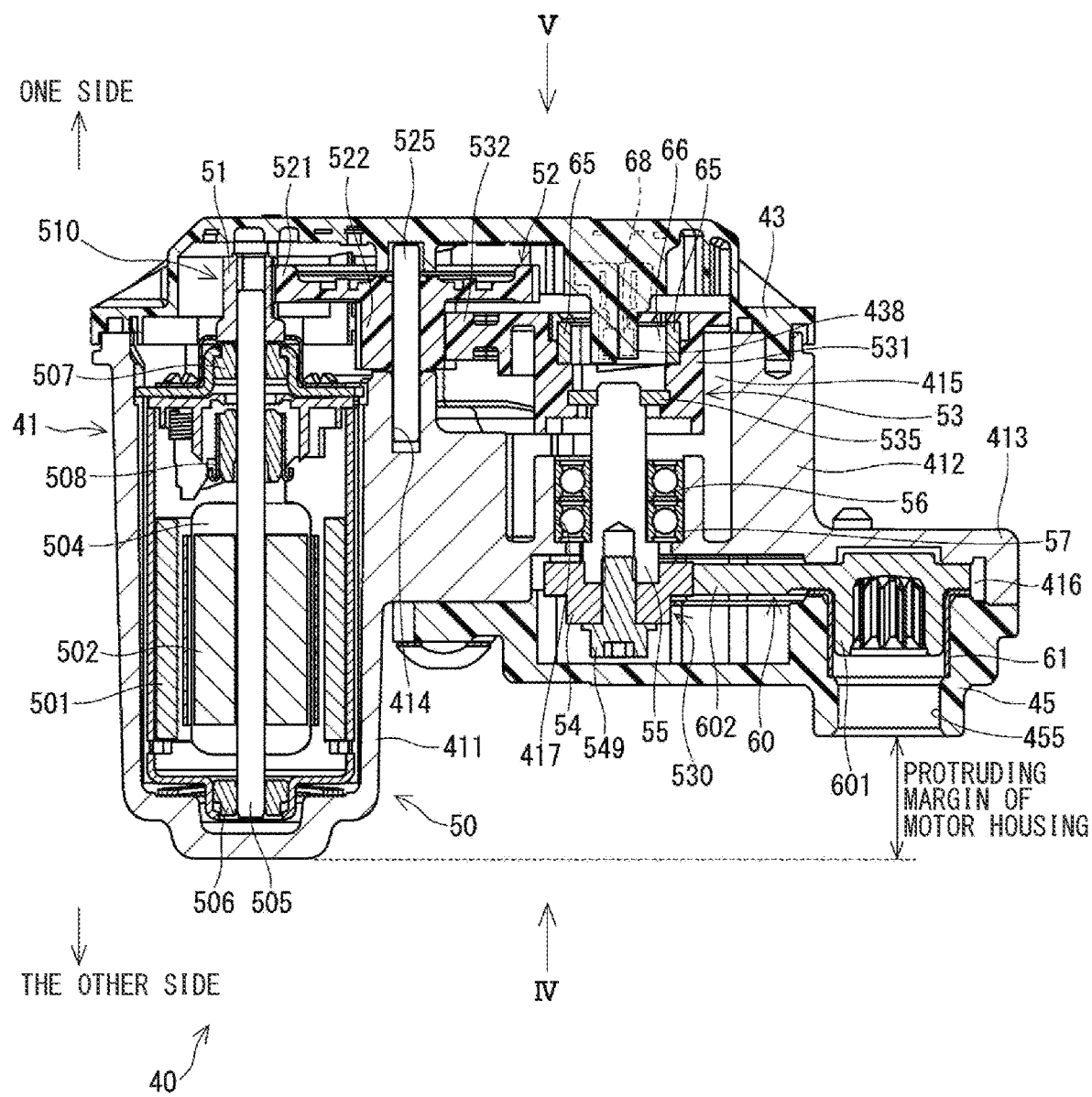
FIG. 3 is a cross-sectional view showing an actuator according to one embodiment.
Figure 4:
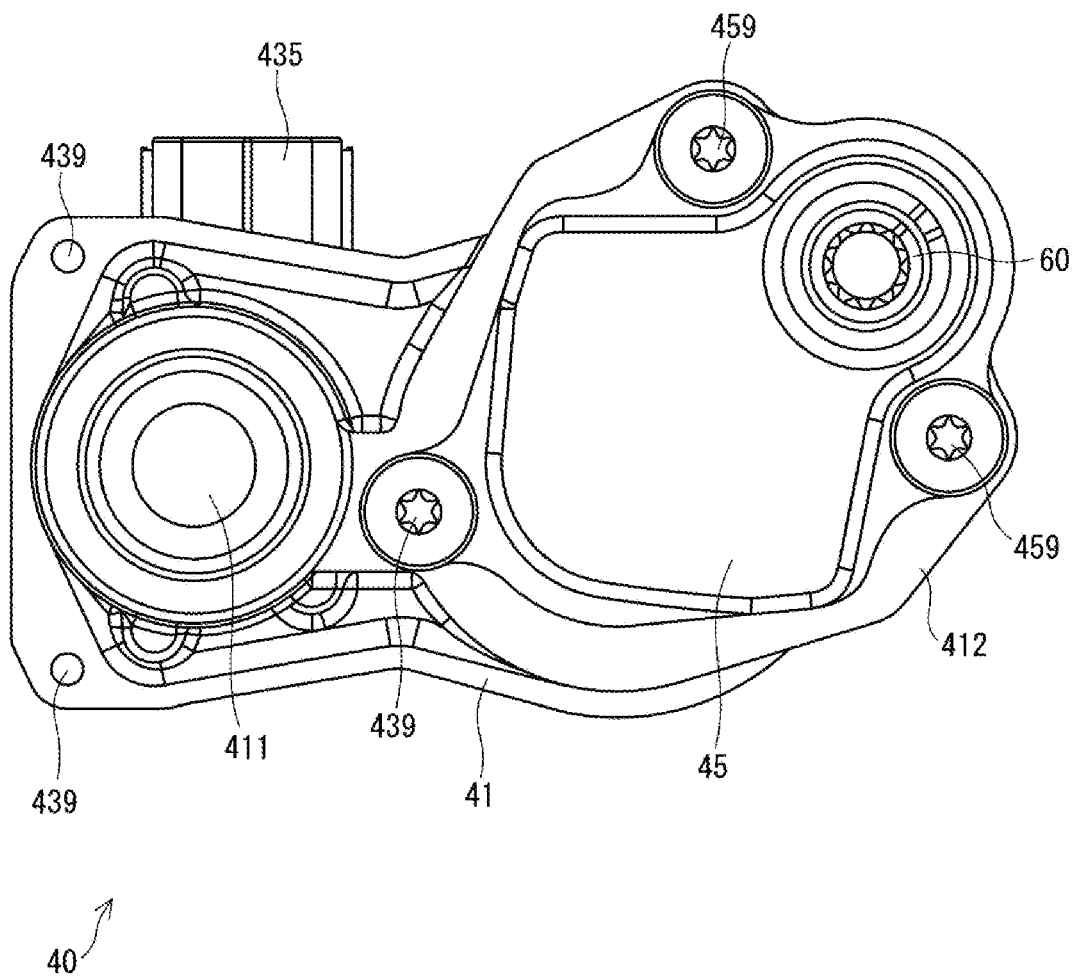
FIG. 4 is a diagram seen from a direction of an arrow VI in FIG. 3.
Figure 5:
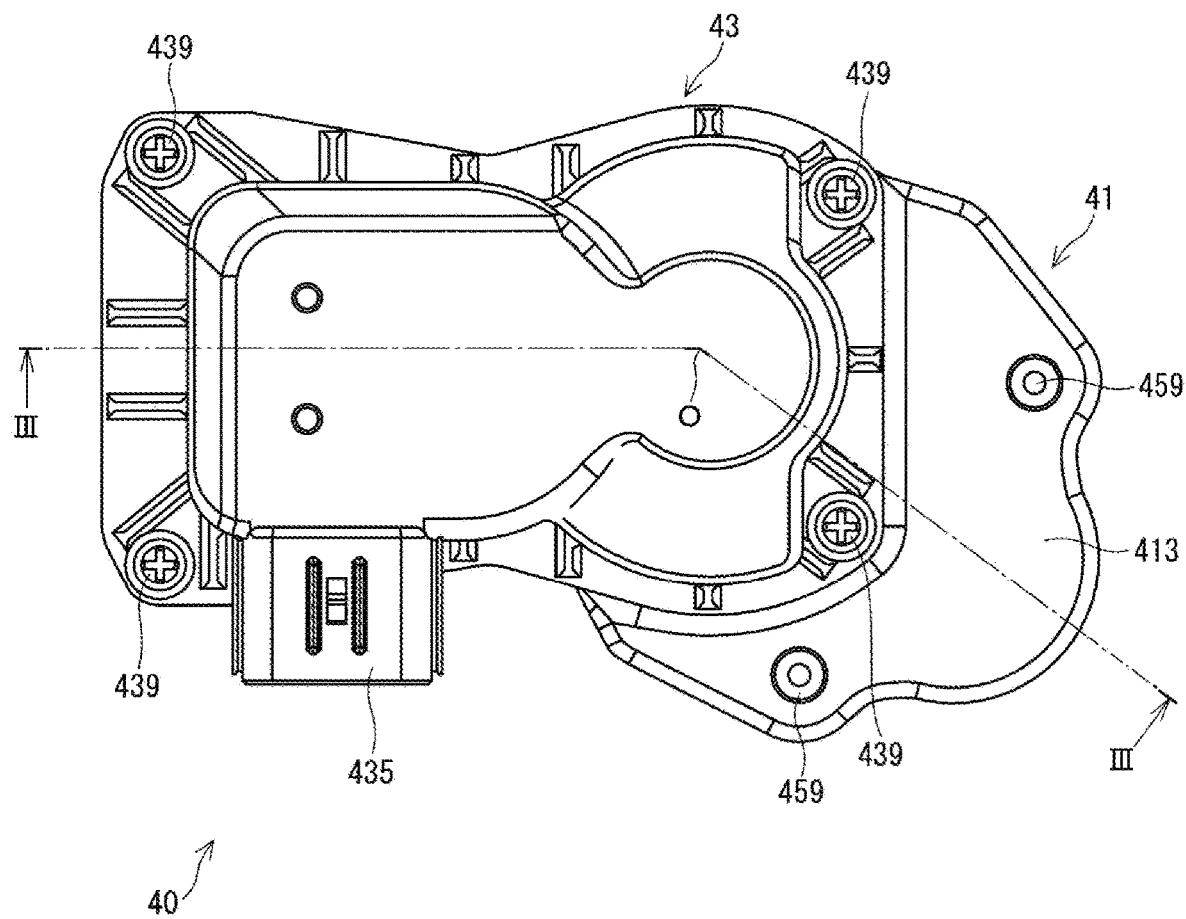
FIG. 5 is a diagram seen from a direction of an arrow V in FIG. 3.

The actuator 40 is shown in FIGS. 3 to 5. FIG. 3 is a cross-sectional view taken along a line III-III in FIG. 5. In FIG. 3, an axial direction of the motor 50 is defined as a vertical direction of the paper, an upper side of the paper is defined as "one side", and a lower side of the paper is defined as "the other side".

A housing 41 is made of metal such as aluminum, and is composed of a motor housing portion 411 and a gear housing portion 412. The motor housing portion 411 is formed in a substantially bottomed cylindrical shape that is open on one side in the axial direction. The gear housing portion 412 is formed to protrude radially outward from the motor housing portion 411. One end face of the gear housing portion 412 is formed substantially flush with one end face of the motor housing portion 411. The other side end surface of the gear housing portion 412 is positioned in a middle of the motor housing portion 411 in the axial direction. In other words, the motor housing portion 411 protrudes to the other side. An output shaft gear housing portion 413 for housing the output shaft gear 60 is formed in the gear housing portion 412 so as to protrude in the opposite direction to the motor housing portion 411.

A sensor cover 43 and a gear cover 45 are provided on both sides of the housing 41. The sensor cover 43 is provided on one side of motor housing portion 411 and gear housing portion 412 and fixed to the housing 41 with a plurality of screws 439. A connector 435 is provided on the sensor cover 43, and power is supplied to the actuator 40 via the connector 435. It also transmits and receives signals to and from the outside via the connector 435. The gear cover 45 is provided on the other side of the gear housing portion 412 and fixed to the housing 41 with the screws 459.

The motor 50 has a magnet 501, a core 502, a coil 504, a motor shaft 505, a commutator 508, and brushes (not shown). The magnet 501 is fixed to the inner peripheral side of motor housing portion 411. The core 502 is provided inside the magnet 501 in the radial direction, and generates a rotational force when current flows through the coil 504 wound around the core 502. The motor shaft 505 is rotatably supported by a pair of bearings 506 and 507 and rotates together with the core 502. The commutator 508 causes the current supplied from the brush to flow through the coil 504.

The power transmission portion 510 is provided between the motor shaft 505 and the output shaft 15 and transmits the driving force of the motor 50 to the output shaft 15. The power transmission portion 510 has gears 51 to 54 and 60. The gears 51 to 54 and 60 are all spur gears.

The motor gear 51 and the gears 52 and 53 are arranged in a first gear chamber 415 that opens to one side of the housing 41. The gear 54 and the output shaft gear 60 are arranged in a second gear chamber 416 that opens on the other side of the housing 41. The first gear chamber 415 and the second gear chamber 416 communicate with each other through a shaft hole 417 through which a gear connection shaft 55 is inserted. In the present embodiment, the motor gear 51, the gear 54, and the output shaft gear 60 are made of metal, and the gears 52 and 53 are made of resin.

The motor gear 51 is fixed to one side of the motor shaft 505 and rotates together with the motor shaft 505. The gear 52 has a large diameter portion 521 and a small diameter portion 522 and rotates together with a shaft 525. A spur tooth is formed on the radially outer side of the large diameter portion 521 and meshes with the motor gear 51. A spur tooth is formed on the radially outer side of the small diameter portion 522 and meshes with the gear 53. The shaft 525 is inserted into an axial hole 414 formed in the housing 41 and rotatably supported.

The gear 53 has a tubular portion 531 and a gear portion 532. The gear portion 532 is formed to protrude radially outward from the tubular portion 531. The gear portion 532 is formed with spur teeth that mesh with the small diameter portion 522 of the gear 52. The gear portion 532 is formed within a range (for example, less than 180°) in which an absolute angle can be detected by a position sensor 68. A shaft fixing member 535 is provided radially inside the tubular portion 531. The shaft fixing member 535 is made of metal, for example.

The gear connection shaft 55 is rotatably supported in the housing 41 by the bearings 56 and 57. In the present embodiment, the bearings 56 and 57 are ball bearings and are press-fitted into the shaft hole 417. By providing a plurality of bearings, tilting of the gear connection shaft 55 can be suppressed. In addition, since rattling in the radial direction of the gear connection shaft 55 can be suppressed, it is possible to reduce the occurrence of wear due to hitting of the shaft.

One side of the gear connection shaft 55 is press-fitted into the shaft fixing member 535 provided radially inside the tubular portion 531 of the gear 53 and fixed by, for example, rolling caulking. Thereby, the gear 53 is fixed to one side of the gear connection shaft 55. The gear 54 is fixed to the other side of the gear connection shaft 55 with a bolt 549. As a result, the tubular portion 351 of the gear 53 and the gear 54 are coaxially connected by the gear connection shaft 55 and rotate together. In the present embodiment, the gear 53 and the gear 54 constitute a connection gear 530. The gear 54 is formed to have substantially the same diameter as the tubular portion 531, and has spur teeth that mesh with the output shaft gear 60 on the entire outer periphery in the radial direction.

The output shaft gear 60 has an output shaft connection portion 601 formed in a substantially cylindrical shape and a gear portion 602. The output shaft connection portion 601 is rotatably supported on the gear cover 45 by a bushing 61 provided radially outward of the output shaft connection portion 601. The output shaft 15 (see FIG. 1) is press-fitted inside the output shaft connection portion 601 in the radial direction, and rotates integrally. The bushing 61 is press-fitted into an output shaft holding portion 455 of the gear cover 45.

The gear portion 602 is formed to protrude radially outward of the output shaft connection portion 601 and meshes with the gear 54. In the present embodiment, a meshing point between the motor gear 51 and the large diameter portion 521 of the gear 52 constitutes a first speed reduction stage, a meshing point between the small diameter portion 522 of the gear 52 and the gear portion 532 of the gear 53 constitutes a second speed reduction stage, and a meshing point between the gear 54 and the gear portion 602 of the output shaft gear 60 constitutes a third speed reduction stage. That is, in the present embodiment, the number of reduction stages is three, and the third reduction stage is a final reduction stage.

The gears 52, 53 and the like are assembled from one side of housing 41, and gear 54 and output shaft gear 60 and the like are assembled from the other side of housing 41. By changing the length of the gear connection shaft 55 that connects the gear 53 and the gear 54, the protruding margin of the motor housing portion 411 can be adjusted according to the mating parts assembled via the actuator 40 and the output shaft 15. As a result, the degree of freedom in mounting can be improved.

A sensor magnet 65 is provided radially inside the tubular portion 531 of the gear 53 and closer to the sensor cover 43 than the shaft fixing member 535. The sensor magnet 65 is formed in a narrow plate shape, for example, and is provided on the opposite side of the gear 53 with the rotating shaft interposed therebetween. In other words, the sensor magnets 65 are provided 180 degrees apart. The sensor magnets 65 are held by a magnet holding member 66 formed in an annular shape. The magnet holding member 66 is fixed to the tubular portion 531 by press fitting or the like.

The position sensor 68 is held by a sensor holding portion 438 that protrudes from the sensor cover 43. The position sensor 68 has a Hall IC that detects changes in the magnetic field due to the rotation of the sensor magnets 65, and is provided so that the sensor element is positioned at the center of the two sensor magnets 65. In the present embodiment, since the reduction ratio of the final reduction stage is 6 or less and the rotation range of the gear 53 is less than 180°, the position sensor 68 can detect the rotation position of the gear 53 as an absolute angle. Further, the absolute angle of the output shaft 15 can be calculated by gear ratio conversion. The position sensor 68 may be a linear sensor, an encoder, a resolver, or the like, and may detect a rotational position other than the gear 53.

The gear 53 provided with the sensor magnet 65 constitutes a speed reduction stage one stage before the final speed reduction stage. Therefore, compared with the output shaft gear 60, the transmission torque is small, and the eccentric force generated by variations in gear tooth surface shape, vibration, and the like is small. Then, compared with the case of detecting the angle of the output shaft gear 60, it is possible to suppress the deterioration of the sensor accuracy. Further, as shown in FIG. 1, the actuator 40 is provided with a current sensor 67 that detects the current of the motor 50 and a temperature sensor 69 that detects the temperature.

The vehicle control device 80 has an actuator control unit (hereinafter "act-ECU") 81 and an MG control unit (hereinafter "MG-ECU") 82. The act-ECU 81 and the MG-ECU 82 are mainly composed of a microcomputer and the like, and internally includes, although not shown in the figure, a CPU, a ROM, a RAM, an I/O, a bus line for connecting these components, and the like. Each process executed by the ECUs may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit.

The vehicle control device 80 acquires detected values of a range sensor 37, the position sensor 68, the temperature sensor 69, a tilt angle sensor 87, and a steering angle sensor 88, and can use these detected values for various controls. Further, an oil temperature of a transmission 7 connected to the detent mechanism 20 (hereinafter referred to as "TM oil temperature") or the like may be used for the energization control of the coil 504. The transmission 7 may be a transaxle or the like. Further, the vehicle control device 80 is provided so as to be able to transmit and receive various information to and from a brake ECU 85.

The range sensor 37 is provided outside the actuator 40 and near the parking lever 33, and is a sensor that determines that the shift range has switched from one of the P range and the notP range to the other thereof. The position sensor 68 is provided inside the actuator 40 and can continuously detect the rotation of the rotating body.

The act-ECU 81 has an actuator drive control section 811 and the like as functional blocks, and controls the energization of the motor 50 based on the shift range requested by the driver, the signal from the brake switch, the vehicle speed, and the like so as to control an operation of the parking lever 33.

The MG-ECU 82 has, as functional blocks, the MG drive control section 821, a range determination section 822, and the like. The MG drive control section 821 controls the drive of the main motor 70 by controlling the ON/OFF operation of the switching elements forming the inverter 71. Based on the detected value of the range sensor 37, the range determination section 822 determines whether or not the range is the P range.

In the present embodiment, the act-ECU 81 and the MG-ECU 82 are provided separately, but they may be configured as one ECU. Also, the act-ECU 81 may be provided integrally with the actuator 40. Further, for example, the range determination section 822 may be provided on the act-ECU 81 side, and various determination processes described later may be executed by either the act-ECU 81 or the MG-ECU 82.

Figure 6:
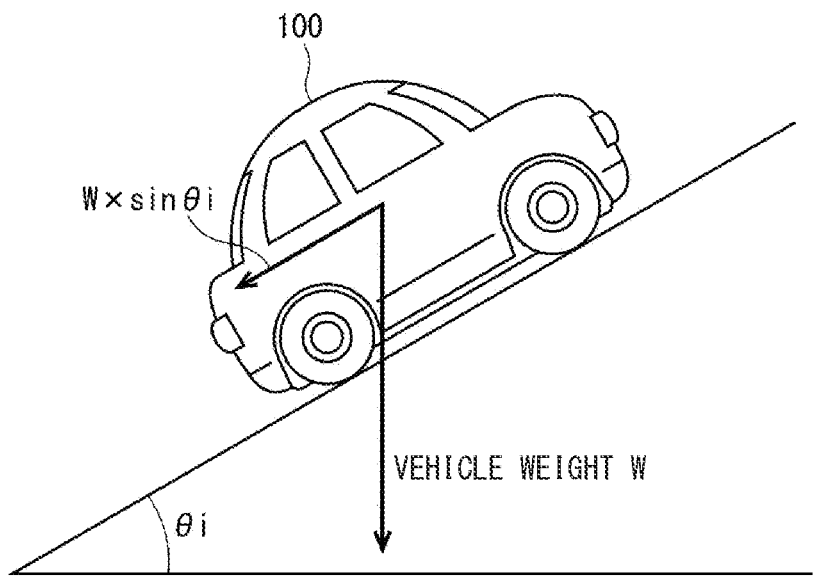
FIG. 6 is an explanatory diagram explaining a state in which the vehicle is tilted.
Figure 7:
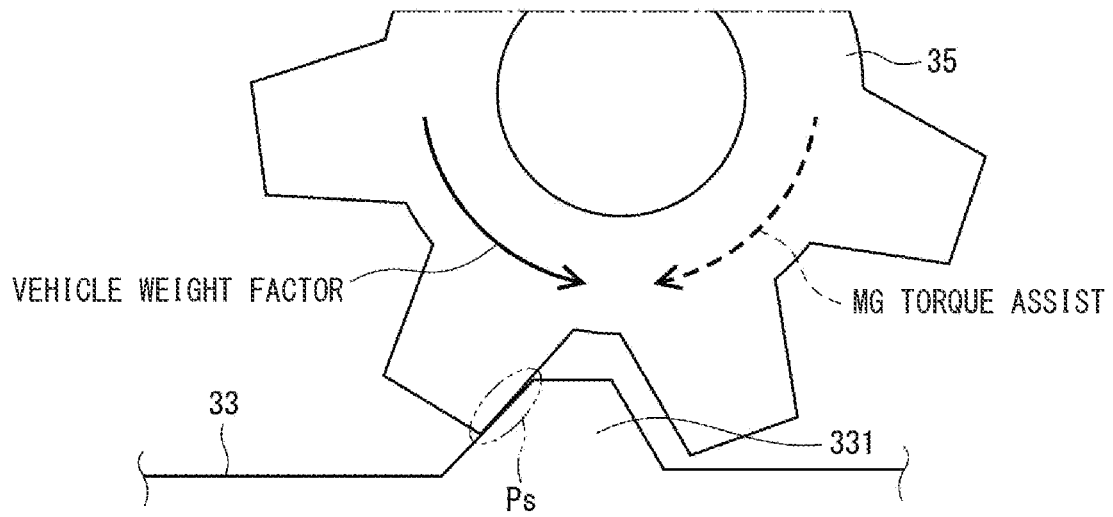
FIG. 7 is a schematic diagram explaining a meshing surface pressure in the parking lock mechanism.

As described above, the parking lock is released by driving the motor 50. As shown in FIG. 6, when the vehicle 100 is stopped in an inclined state, a load L (see formula (1)) corresponding to a vehicle weight W and a tilt angle θi is applied to the vehicle 100 in a longitudinal direction. As shown in FIG. 7, the load L corresponding to the vehicle weight W and the tilt angle θi is applied to a surface pressure generating portion Ps where the parking lever 33 and the parking gear 35 mesh.

$$L = W \times \sin\theta i \quad (1)$$

Therefore, when pulling out the parking lever 33 from the parking gear 35, if the vehicle 100 is stopped in the inclined state, a larger torque is required due to the meshing load than when the vehicle is stopped on a flat road. Hereinafter, pulling out the protrusion 331 of the parking lever 33 from the parking gear 35 will be referred to as "P removal".

Figure 8:
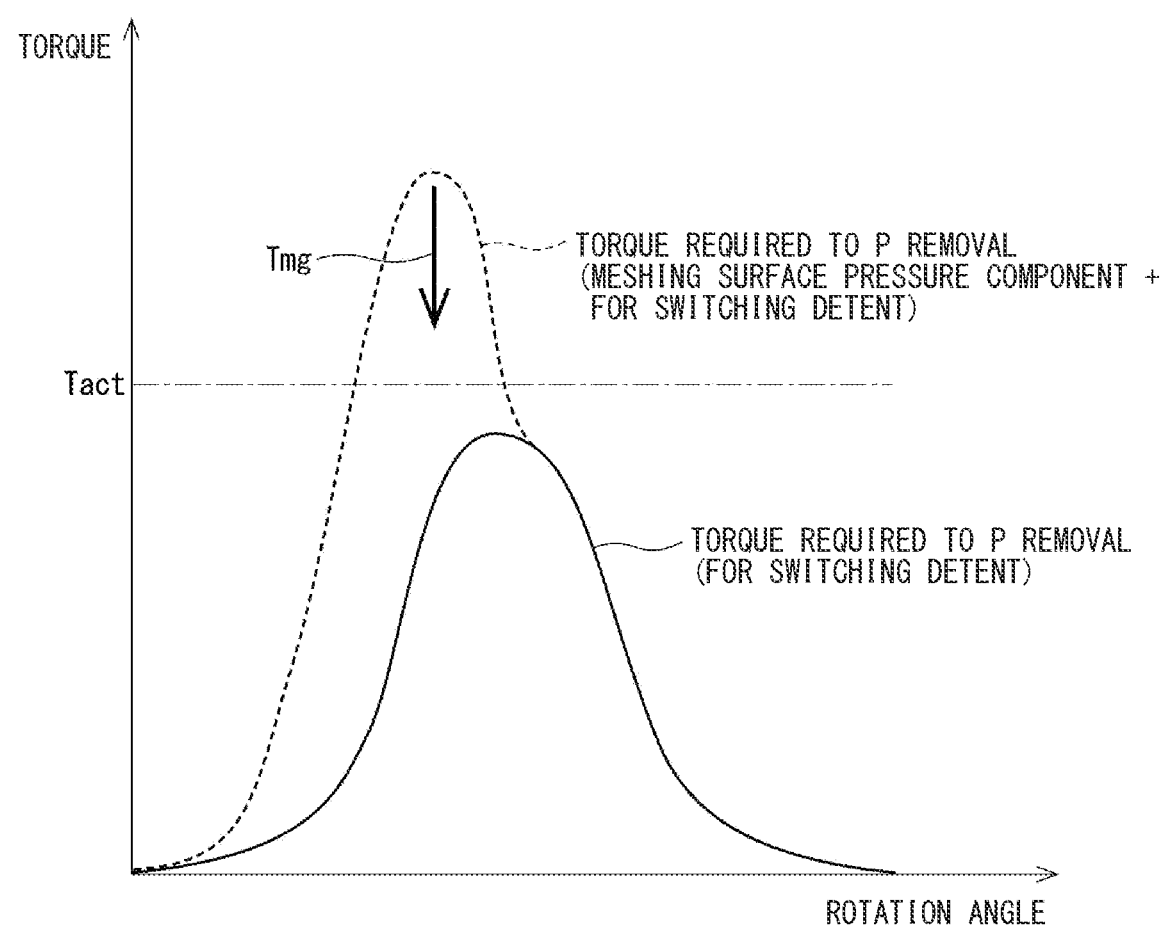
FIG. 8 is an explanatory diagram explaining a torque required to a P removal.

In FIG. 8, a horizontal axis represents the rotation angle of the actuator 40, and a vertical axis represents the torque of the actuator 40. As shown in FIG. 8, when performing the P removal in a state where the meshing surface pressure is applied, in addition to the torque for switching the detent of the detent mechanism 20 shown by the solid line, the torque of the meshing surface pressure component shown by the broken line is required. Therefore, when the torque that can be output by the actuator 40 is relatively small, for example, as indicated by the dashed line, there is a possibility that the output torque Tact of the actuator 40 alone may not be enough to perform the P removal. Further, when the torque of the meshing surface pressure component is compensated by the actuator 40, a physical size of the actuator 40 is increased.

Figure 9:
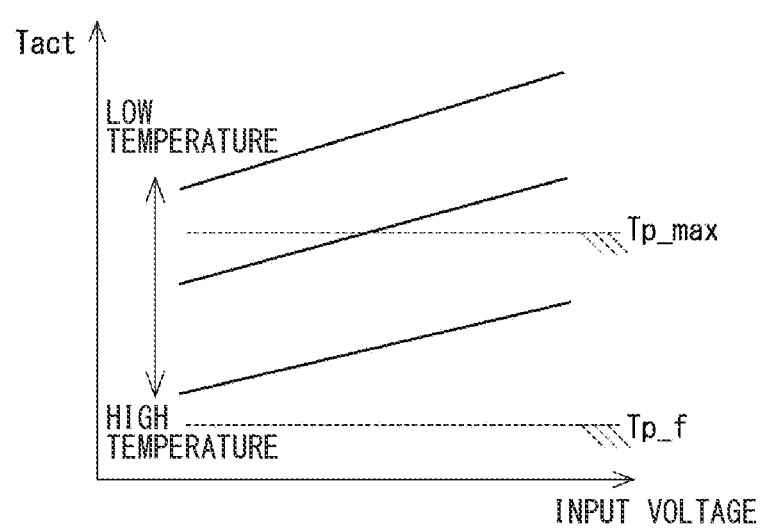
FIG. 9 is an explanatory diagram explaining the output torque of the actuator according to one embodiment.

In FIG. 9, the horizontal axis represents an input voltage V of the actuator 40, and the vertical axis represents an output torque Tact of the actuator 40. The torque required to perform the P removal on a flat road is represented by Tp_f, and the torque required to preform the P removal on the assumed maximum slope is represented by Tp_max. In the actuator 40, when the temperature is high and the voltage is low, the output torque Tact of the actuator 40 decreases. Therefore, depending on the inclined state of the vehicle, the temperature condition, and the input voltage V, there is a region where the P removal cannot be performed only by the torque of the motor 50.

Therefore, in the present embodiment, the main motor 70 is driven as necessary when the P removal is performed to generate torque that cancels the torque of the meshing surface pressure component. As a result, it is possible to reduce the meshing surface pressure component due to the vehicle weight by the MG torque Tmg. Therefore, the torque required for the motor 50 can be reduced and the size of the motor 50 can be reduced as compared with the case where the P removal is performed only by the motor 50. In addition, it is possible to reduce the energization amount and heat load of a drive circuit (not shown) for driving the motor 50.

Figure 10:
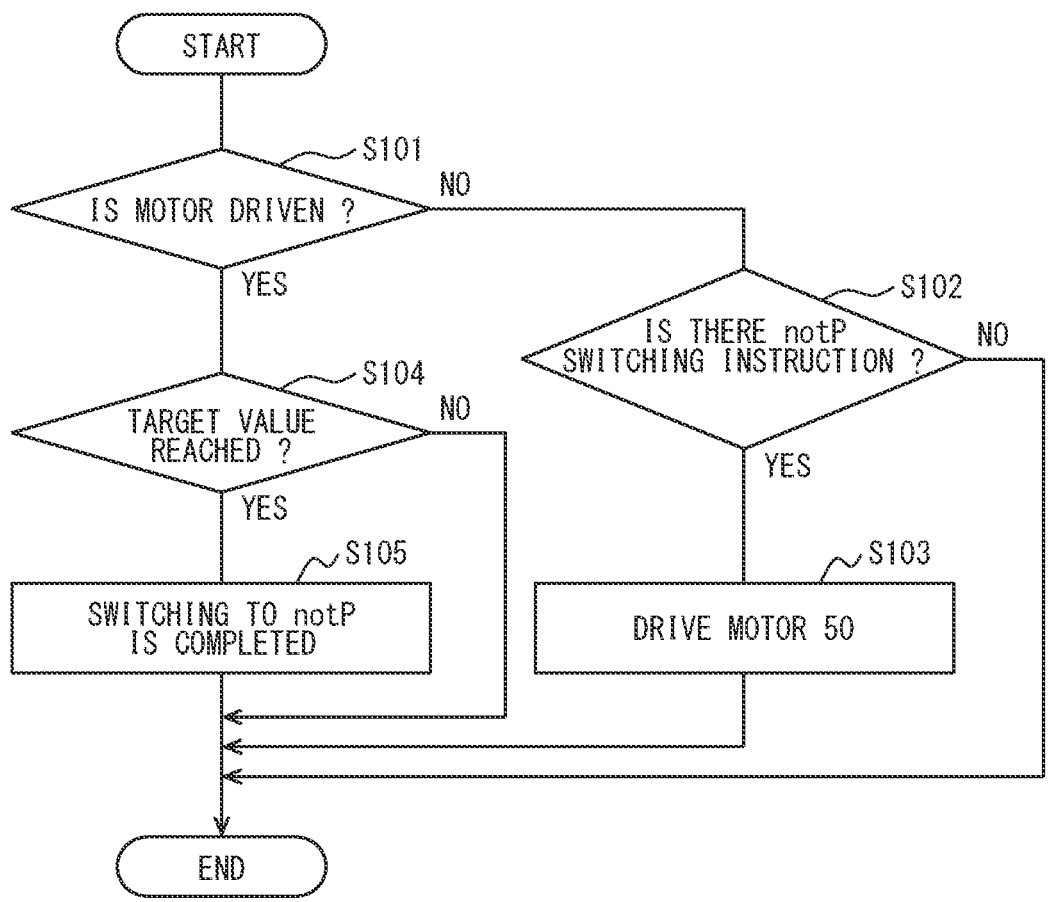
FIG. 10 is a flowchart explaining an actuator control process according to one embodiment.

In the present embodiment, the driving of the motor 50 and the main motor 70 is controlled based on the detected value θsns of the position sensor 68. An actuator control processing will be described based on the flowchart of FIG. 10. This processing is executed at a predetermined cycle by the actuator drive control section 811 when the shift range is the P range. Hereinafter, "step" in step S101 is omitted, and is simply referred to as a symbol "S".

In S101, the actuator drive control section 811 determines whether the motor 50 is being driven. When it is determined that the motor 50 is being driven (S101: YES), the process proceeds to S104. When it is determined that the motor 50 is not being driven (S101: NO), the process proceeds to S102.

In S102, the actuator drive control section 811 determines whether or not there is a notP switching instruction. Here, the actuator drive control section 811 determines based on the switching instruction from the MG-ECU 82, but the determination may be made internally based on the shift signal or the like. When it is determined that there is no notP switching instruction (S102: NO), the process of S103 is skipped. When it is determined that there is the notP switching instruction (S102: YES), the process proceeds to S103.

In S103, the actuator drive control section 811 sets a target value θ* that allows switching from the P range to the notP range, and drives the motor 50 so that the detected value θsns of the position sensor 68 becomes the target value θ*.

In S104, which is shifted to when it is determined that the motor 50 is being driven (S101: YES), the actuator drive control section 811 determines whether or not the detected value θsns of the position sensor 68 has reached the target value θ*. When it is determined that the detected value θsns has not reached the target value θ* (S104: NO), the drive control for the motor 50 is continued. When it is determined that the detected value θsns has reached the target value θ* (S104: YES), the process proceeds to S105, the actuator drive control section 811 determines that the switching to the notP range has been completed, and stops the motor 50. In addition, the act-ECU 81 transmits to MG-ECU 82 information indicating that the switching has been completed.

Figure 11:
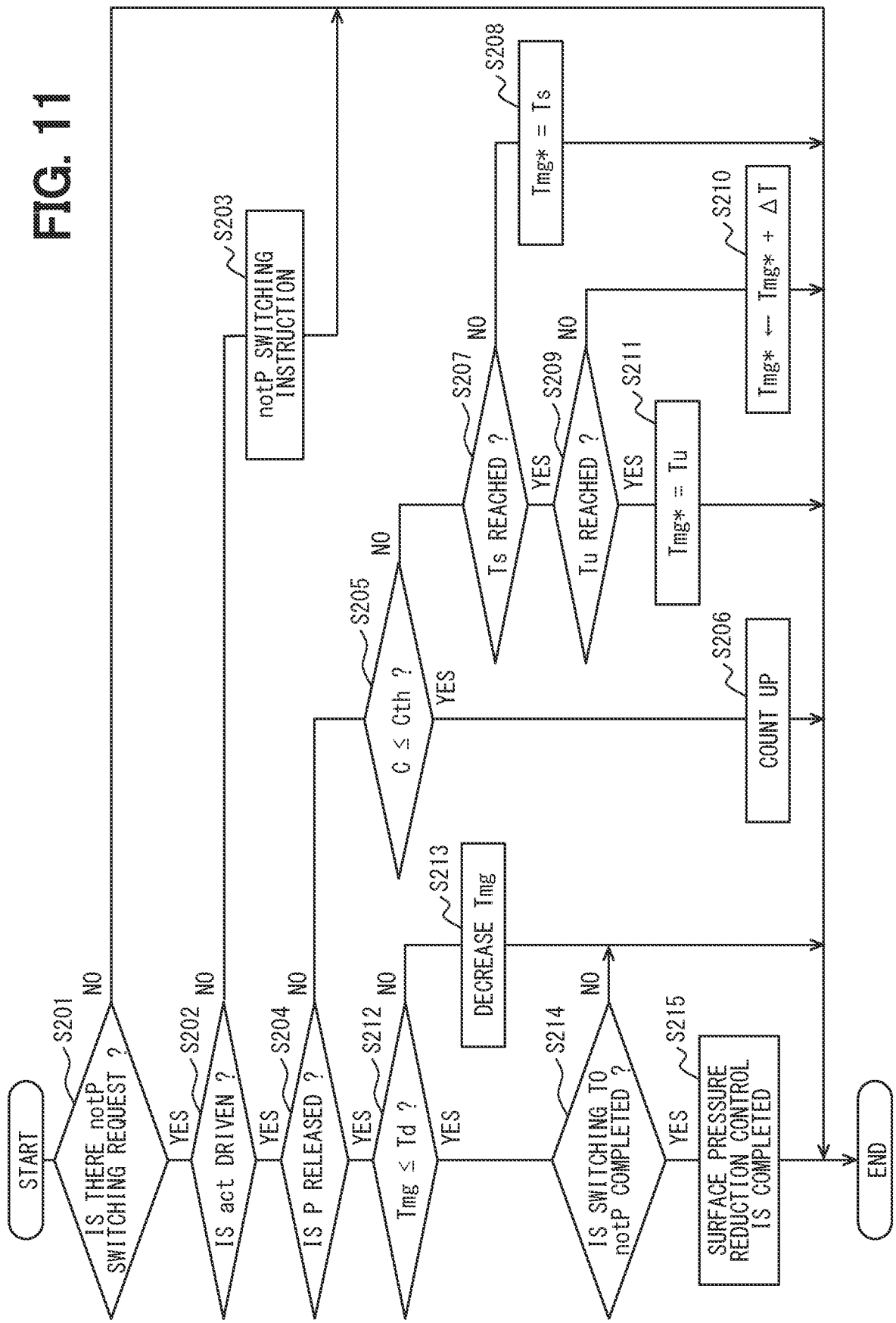
FIG. 11 is a flowchart explaining MG control processing according to a fifth embodiment.

The MG control processing will be described based on the flowchart of FIG. 11. This processing is executed at a predetermined cycle by MG-ECU 82 when the shift range is the P range.

In S201, the MG-ECU 82 determines whether or not there is a notP switching request. When it is determined that there is no notP switching request (S201: NO), the process after S202 is skipped. When it is determined that there is the notP switching request (S201: YES), the process proceeds to S202.

In S202, the MG-ECU 82 determines whether or not motor 50 (denoted as "act" in the figure) is being driven. When it is determined that the motor 50 is not being driven (S202: NO), the process proceeds to S203 and transmits a notP switching instruction to the act-ECU81. When it is determined that the motor 50 is being driven (S202: YES), the process proceeds to S204.

In S204, the range determination section 822 determines whether or not the P range has been released based on the detected value of the range sensor 37. When it is determined that the P range has been released (S204: YES), the process proceeds to S212. When it is determined that the P range has not been released (S204: NO), the process proceeds to S205.

In S205, the range determination section 822 determines whether or not a count value C is equal to or less than a determination threshold value Cth corresponding to the P range release determination time Xth. The P range release determination time Xth will be described later. When it is determined that the count value C is equal to or less than the determination threshold value Cth (S205: YES), the process proceeds to S206 and the count value C is counted up. When it is determined that the count value C is greater than the determination threshold value Cth (S205: NO), the process proceeds to S207.

In S207, the MG drive control section 821 determines whether or not the MG torque Tmg has reached an initial torque value Ts. The initial torque value Ts is a value that can reduce the meshing surface pressure, and is set to a value that allows the motor 50 to start moving, for example. Also, the initial torque value Ts may be a learning value. When it is determined that the MG torque Tmg has not reached the initial torque value Ts (S207: NO), the process proceeds to S208 and the MG torque command value Tmg* is set to the initial torque value Ts. When it is determined that the MG torque Tmg has reached the initial torque value Ts (S207: YES), the process proceeds to S209.

In S209, the MG drive control section 821 determines whether or not the MG torque Tmg has reached the upper limit torque value Tu. The upper limit torque value Tu is the maximum torque in the meshing surface pressure reduction control, and is set to a value that allows the meshing surface pressure to be reduced so that the actuator 40 operates reliably. When it is determined that the MG torque Tmg has not reached the upper limit torque value Tu (S209: NO), the process proceeds to S210 to increase the MG torque command value Tmg* by a gradual change amount ΔT. When it is determined that the MG torque Tmg has reached the upper limit torque value Tu (S209: YES), the process proceeds to S211 to set the MG torque command value Tmg* to the upper limit torque value Tu.

When it is determined that the P range has been released (S204: YES), the process proceeds to S212. In S212, the MG drive control section 821 determines whether or not the MG torque Tmg is equal to or less than a traveling torque Td. When the set traveling torque is 0, then the traveling torque Td is 0. When it is determined that the MG torque Tmg is greater than the traveling torque Td (S212: NO), that is, when the surface pressure reducing torque is output, the process proceeds to S213 to reduce the MG torque Tmg. When it is determined that the MG torque Tmg is equal to or less than the traveling torque Td (S212: YES), the process proceeds to S214. When the traveling torque Td is not 0 and the MG torque Tmg is smaller than the traveling torque Td, the MG torque Tmg is controlled by separate processing.

In S214, the range determination section 822 determines whether switching to the notP range has been completed. When it is determined that the switching to the notP range has not been completed (S214: NO), the current state is maintained. When it is determined that the switching to the notP range has been completed (S214: YES), the process proceeds to S215, and the surface pressure reduction control when performing the P removal is completed.

Figure 12:
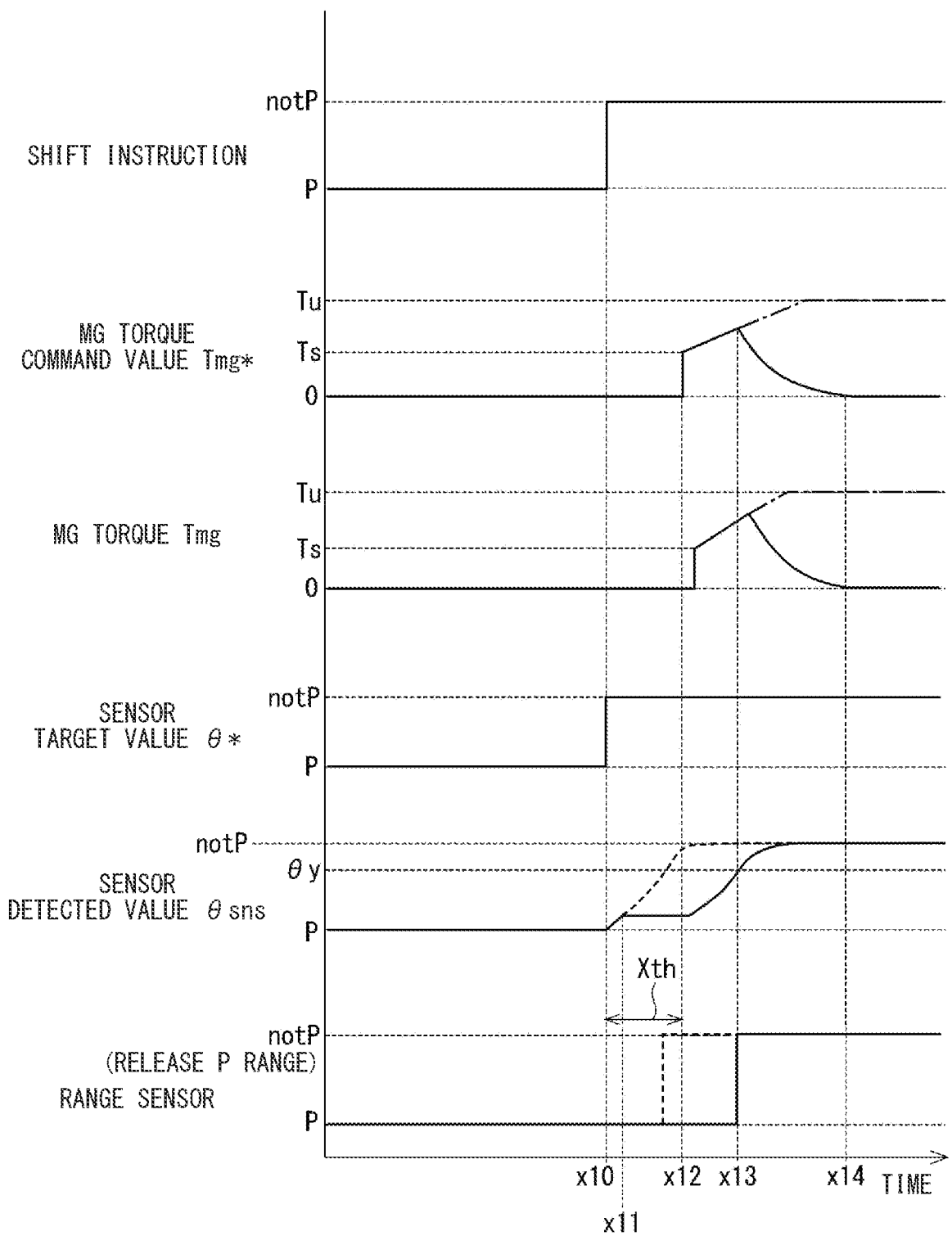
FIG. 12 is a time chart explaining the control processing of the P removal according to one embodiment.

The P removal control processing will be described based on the time chart of FIG. 12. In FIG. 12, the horizontal axis represents a common time axis, and the vertical axis represents, from the top, a shift instruction, a MG torque command value Tmg*, a MG torque Tmg, a target value θ* of the position sensor 68, the detected value θsns of the position sensor 68, and the range sensor. The value of the position sensor 68 is described as corresponding ranges where appropriate. Further, the description will be made assuming that the traveling torque Td is equal to 0 (Td=0) during performing the P removal.

At time x10, when the shift instruction is switched from the P range to the not P range, the driving of the motor 50 is started. When the meshing surface pressure is not generated, the motor 50 does not stagnate, and the P removal is completed by the torque of the motor 50, as indicated by the dashed line.

When there is a meshing surface pressure that makes it impossible to perform the P removal due to the torque of the motor 50, at time x11, the detected value θsns of the position sensor 68 stagnates at a position where the detected value θsns is smaller than the P range release position θy.

At time x12 when the P range release determination time Xth has elapsed from the start of range switching, the MG torque command value Tmg* is set to an initial torque value Ts, and the main motor 70 is driven. Also, the MG torque command value Tmg* is gradually increased. The MG torque Tmg follows the change in the MG torque command value Tmg* with a delay, but the details of following with a delay will be omitted.

At time x13, when the stagnation of the actuator 40 is resolved, the detected value θsns of the position sensor 68 reaches the P range release position θy, and the range sensor switches from the P range to the not P range, the MG torque command value Tmg* is decreased. When the stagnation of the actuator 40 is not resolved, the MG torque command value Tmg* is increased to the upper limit torque value Tu, as indicated by the dashed line.

The MG torque command value Tmg* is set to 0 at time x14 when the range switching is completed. In the example of FIG. 12, the timing of the completion of the range switching and the timing of the MG torque command value Tmg* becoming 0 are approximately the same. However, the MG torque command value Tmg* may become 0 before the range switching is completed.

Alternatively, the initial torque value Ts may be set to 0, and the MG torque Tmg may be gradually increased from a state in which the main motor 70 is stopped. Alternatively, the initial torque value Ts may be equal to the upper limit torque value Tu, and the upper limit torque value Tu may be output from time x12.

By the way, the responsiveness of the actuator 40 varies depending on the operating environment such as the temperature of the actuator 40 and the tilting state of the vehicle 100. Therefore, in the present embodiment, the P range release determination time Xth is made variable according to the operating environment.

Figure 13:
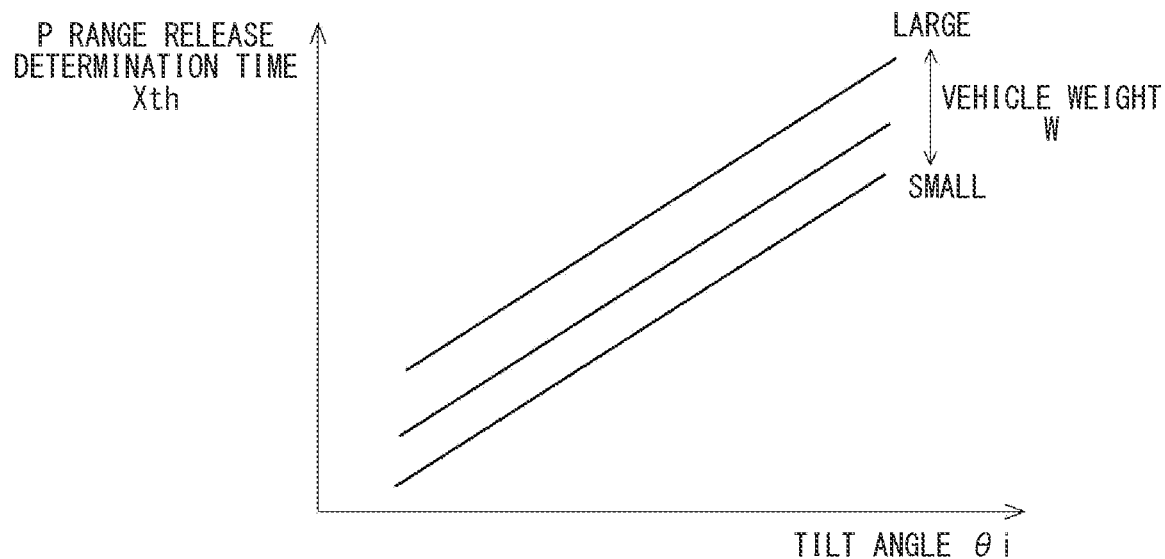
FIG. 13 is an explanatory diagram explaining a setting of P range release determination time according to a tilt angle and a vehicle weight according to one embodiment.

As shown in FIG. 13, when the tilt angle θi of the vehicle 100 and the vehicle weight W are large, there is a possibility that the meshing surface pressure is large. Therefore, the heavier the vehicle weight W, the longer the P range release determination time Xth. The vehicle weight W is a value set between the vehicle weight and the gross vehicle weight, but may be learned from a sensor capable of detecting passengers, an acceleration sensor, or the like. Also, the larger the tilt angle θi, the longer the P range release determination time Xth.

In FIG. 13, three maps corresponding to the vehicle weight W are shown, but the number of maps may be two or four or more. The P range release determination time Xth may be set based on the tilt angle θi regardless of the vehicle weight W. Further, instead of map calculation, a function or the like may be used to set the P range release determination time Xth. The same as above applies to FIG. 14.

Figure 14:
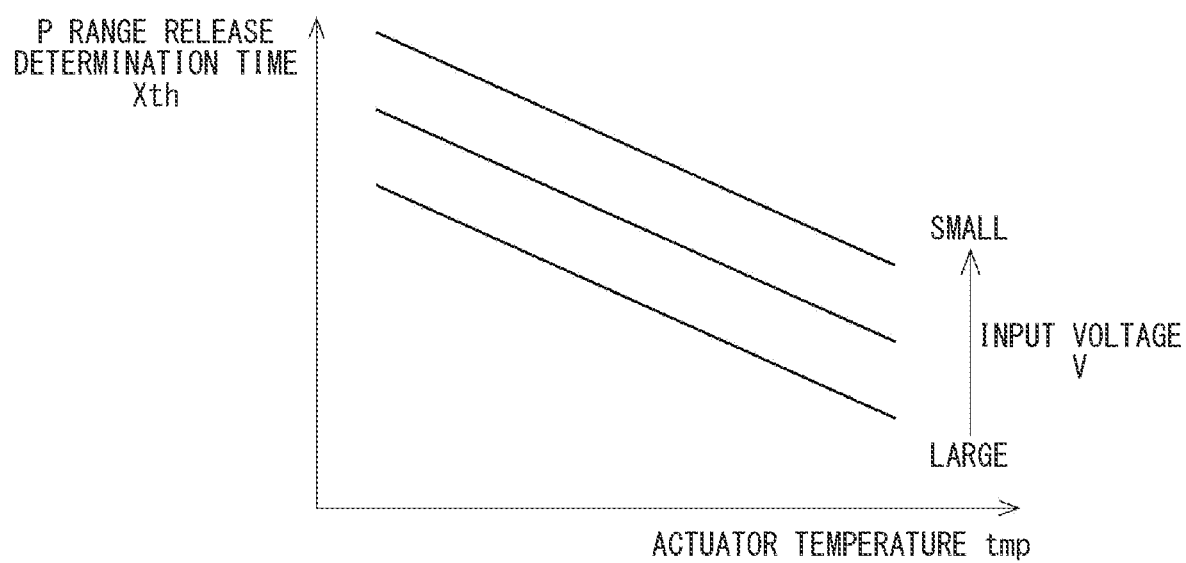
FIG. 14 is an explanatory diagram explaining a setting of P range release determination time according to an input voltage and an actuator temperature according to one embodiment.

Further, as shown in FIG. 14, in the present embodiment, the P range release determination time Xth is set according to the responsiveness of the actuator 40. Specifically, the lower the input voltage V, the longer the P range release determination time Xth. Also, the higher the actuator temperature tmp, the shorter the P range release determination time Xth. In the present embodiment, the detected value of the temperature sensor 69 is regarded as the actuator temperature tmp, but instead of the actuator temperature, the TM oil temperature may be used.

As described above, the vehicle control device 80 controls the vehicle drive system 90 including the main motor 70 that is the driving source of the vehicle 100, the parking lock mechanism 30 and the actuator 40. The parking lock mechanism 30 has the parking gear 35 connected to the axle 95 and the parking lever 33 that can be engaged with the parking gear 35. The engagement of the parking gear 35 and the parking lever 33 allows the axle 95 to be locked. The actuator 40 can drive the parking lever 33. The actuator 40 of the present embodiment has a usage environment region where the parking lock cannot be released when the meshing surface pressure is generated.

The vehicle control device 80 includes an actuator drive control section 811 that controls drive of the actuator, the MG drive control section 821 that controls drive of the main motor 70, and a range determination section 822 that determines whether or not the shift range is the parking range.

When releasing the parking lock, if the parking range is not released within the P range release determination time Xth that is variable according to the operating environment, the MG drive control section 821 performs meshing surface pressure reduction control for driving the main motor 70 so as to reduce the meshing surface pressure between the parking gear 35 and the parking lever 33.

As a result, the actuator 40 can be miniaturized, and the P removal can be reliably performed. Further, even when the range determination is performed by a sensor such as the range sensor 37 that cannot detect the detailed position of the actuator 40 within the range of the P range, the P range release determination time Xth can be changed according to the operating environment so that the meshing surface pressure reduction control can be appropriately started. Moreover, since the responsiveness can be improved, the heat generation of the motor 50 and the IC involved in driving the motor 50 can be suppressed.

The P range release determination time Xth is variable according to at least one of the tilt angle θi of vehicle 100 and the weight of vehicle 100. As the meshing surface pressure increases, there is a possibility that the responsiveness will decrease. Therefore, by making the P-range release determination time Xth variable according to at least one of the tilt angle θi and the vehicle weight W, it is possible to appropriately determine whether the main motor 70 needs to be driven in the meshing surface pressure reduction control.

The P range release determination time Xth is variable according to the actuator temperature tmp and the input voltage V of the actuator 40. By setting the P range release determination time Xth with a parameter that contributes to the responsiveness of the actuator 40, it is possible to appropriately start the meshing surface pressure reduction control.

In the present embodiment, the MG drive control section 821 corresponds to the "main motor drive control section", and the P range release determination time Xth corresponds to the "parking range release determination time".

Other Embodiments

In the above embodiment, the P range release determination time Xth is set according to the vehicle weight W, the tilt angle θi of the vehicle 100, the input voltage V, and the actuator temperature tmp. In another embodiment, at least part of the vehicle weight W, the tilt angle θi of the vehicle 100, the input voltage V, and the actuator temperature tmp may not be used for setting the P range release determination time. Further, parameters related to the operating environment other than the vehicle weight W, the tilt angle θi of the vehicle 100, the input voltage V, and the actuator temperature tmp may be used to set the P range release determination time.

In the above embodiment, the range determination section determines whether or not the shift range is the parking range based on the detected value of the range sensor. In another embodiment, the range determination section may determine whether or not the vehicle is in the parking range using a sensor or the like other than the range sensor.

In the above embodiments, the number of reduction stages of the actuator are three. In another embodiment, the number of reduction stages may be two, four or more. Further, it is sufficient that the driving of the motor can be transmitted to the output shaft, and the structure of the mechanism for transmitting power from the motor to the output shaft may be different.

In the above embodiments, the motor is a brushed DC motor. In another embodiment, the motor may be other than a brushed DC motor. Further, in the above embodiments, the actuator has a usage region where the parking lock cannot be released when the meshing surface pressure is generated. In another embodiment, the actuator may not have the usage region where the parking lock cannot be released. Even in such a case, the load on the actuator can be reduced by performing the meshing surface pressure reduction control by the main motor.

In the above embodiments, the detent plate, which is the detent member, is provided with two valley portions. As another embodiment, the number of the valley portions is not limited to two and may be three or more. The configuration of the detent mechanism and the parking lock mechanism or the like may be different from those in the embodiments described above. In the above embodiment, the parking lock state is maintained by the detent mechanism 20. In another embodiment, instead of the detent mechanism 20, the parking lock state may be maintained by the self-locking mechanism of the actuator 40 itself.

The control unit and the technique according to the present disclosure may be achieved by a dedicated computer provided by constituting a processor and a memory programmed to execute one or more functions embodied by a computer program. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A vehicle control device for controlling a vehicle drive system,
the vehicle drive system including
a main motor as a driving source of a vehicle,
a parking lock mechanism having a parking gear connected to an axle and a parking lever configured to be engaged with the parking gear so that an engagement of the parking gear and the parking lever allows the axle to be locked, and
an actuator configured to drive the parking lever, the vehicle control device comprising:
an actuator drive control section configured to control a drive of the actuator;
a main motor drive control section configured to control a drive of the main motor; and
a range determination section configured to determine whether a shift range is a parking range, wherein
when the parking lock is released, if the parking range is not released within a parking range release determination time, which is variable according to an operating environment,
the main motor drive control section performs a meshing surface pressure reduction control for driving the main motor so as to reduce a meshing surface pressure between the parking gear and the parking lever.

2. The vehicle control device according to claim 1, wherein
the parking range release determination time is variable according to a tilt angle of the vehicle.

3. The vehicle control device according to claim 1, wherein
the parking range release determination time is variable according to a weight of the vehicle.

4. The vehicle control device according to claim 1, wherein
the parking range release determination time is variable according to a temperature of the actuator.

5. The vehicle control device according to claim 1, wherein
the parking range release determination time is variable according to an input voltage of the actuator.

6. The vehicle control device according to claim 1, wherein
the actuator has a usage environment region where the parking lock is not released when the meshing surface pressure is generated.

\* \* \* \* \*